July 11, 1939.   J. MIHALYI   2,165,403
CONTROL MECHANISM FOR FOCAL PLANE SHUTTERS
Original Filed Nov. 13, 1937   5 Sheets-Sheet 1

JOSEPH MIHALYI
INVENTOR

BY  *Newton M. Perrine*
*Donald H. Stewart*
ATTORNEYS

July 11, 1939.  J. MIHALYI  2,165,403
CONTROL MECHANISM FOR FOCAL PLANE SHUTTERS
Original Filed Nov. 13, 1937   5 Sheets-Sheet 2

JOSEPH MIHALYI
INVENTOR

BY

ATTORNEYS

July 11, 1939.  J. MIHALYI  2,165,403

CONTROL MECHANISM FOR FOCAL PLANE SHUTTERS

Original Filed Nov. 13, 1937    5 Sheets-Sheet 4

JOSEPH MIHALYI
INVENTOR

BY

ATTORNEYS

July 11, 1939.  J. MIHALYI  2,165,403
CONTROL MECHANISM FOR FOCAL PLANE SHUTTERS
Original Filed Nov. 13, 1937   5 Sheets-Sheet 5

JOSEPH MIHALYI
INVENTOR
BY
ATTORNEYS

Patented July 11, 1939

2,165,403

UNITED STATES PATENT OFFICE 2,165,403

CONTROL MECHANISM FOR FOCAL PLANE SHUTTERS

Joseph Mihalyi, Rochester, N. Y., assignor to Eastman Kodak Company, Rochester, N. Y., a corporation of New Jersey Original application November 13, 1937, Serial No. 174,443. Divided and this application July 20, 1938, Serial No. 220,304

14 Claims. (Cl. 95—57)

This invention relates to photography and more particularly to control mechanisms for shutters of the focal plane type.

One of the objects of my invention is to provide a focal plane shutter so arranged that the speed of the shutter may be set independently of any movement of the shutter curtains. Another object of my invention is to provide a shutter tripping mechanism in which one curtain is released in advance of the other curtain and in which the tripping member for the second curtain is normally held in an inoperative position, but is moved into an operative position each time the first curtain is released. Still another object of my invention is to provide a floating release lever pivotally mounted in such a way that it may be swung toward the second curtain release and an adjustable stop in such a manner that when one end strikes the adjustable stop, the other end will release the tripping latch for the second curtain, thereby permitting the second curtain to follow the first after a predetermined time interval. Other objects will appear from the following specification, the novel features being particularly pointed out in the claims at the end thereof.

This application is a division of my copending application for Focal plane shutter, Serial No. 174,443, filed November 13, 1937.

Coming now to the drawings wherein like reference characters denote like parts throughout.

Brief general description

In accordance with my invention a camera may be provided with a curtain shutter consisting of two parts each of which may move independently. In normal operation one depression of a release button causes one curtain to move to form a slit and upon releasing the button the second curtain moves with the first across the exposure aperture to make an exposure. The shutter curtains and film may be rewound together eliminating double exposures. The shutter may be released only when the shutter is completely wound. A single retarding device may be used either for delaying the start of an exposure or delaying the duration of an exposure or both. At each operation of the shutter as a fresh area of film is presented for exposure there is a counter which indicates the number of exposures made.

While in the illustrated embodiment a "miniature type" of camera is shown and described obviously any size of film and camera can be used. Since the camera button or trigger is released rather than pushed to make an exposure as in the known types of cameras there is but little chance of shaking the camera.

Showing in drawings

In view of the small size of the parts the drawings show, mostly on enlarged scales, many of the parts. It should be pointed out that in many figures certain parts have been omitted to avoid complication and so that the operations may be more easily understood. Certain supports and parts omitted in some instances are shown in other figures to illustrate their particular functions. Therefore, the figures of the drawings may not be complete each in itself but the structure necessary to understand the invention is present in one figure or another.

Illustrated embodiment

Figure 1:
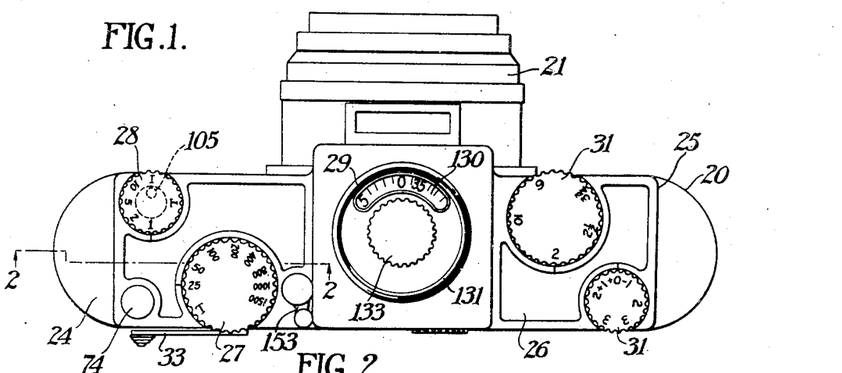
Fig. 1 is a top plan view of a camera equipped with a shutter constructed in accordance with this invention.
Figures 2, 3:
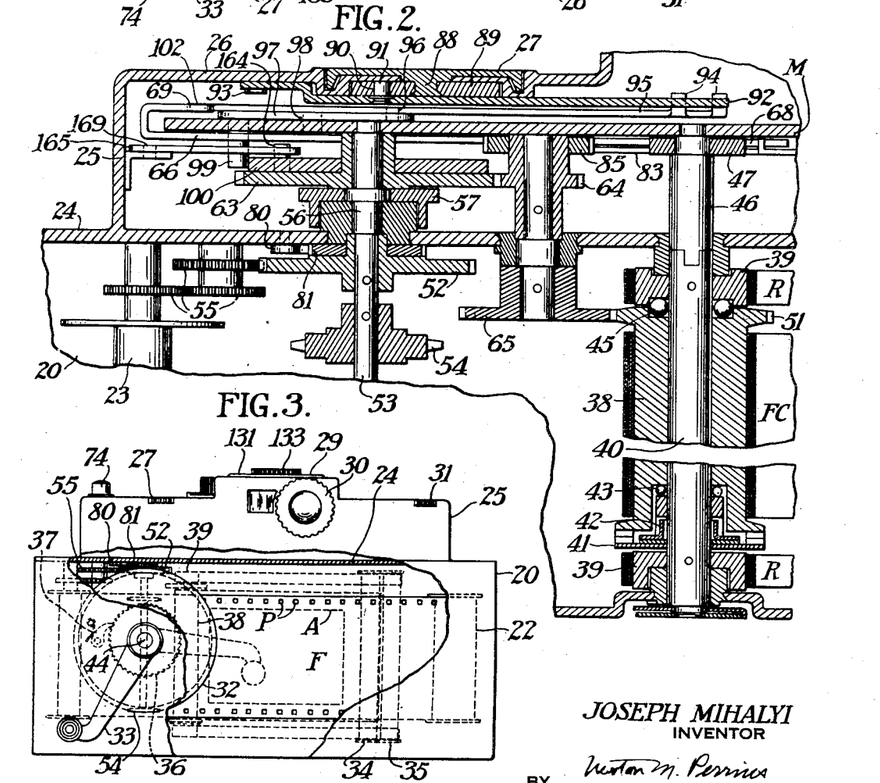
Fig. 2 is an enlarged fragmentary vertical sectional view approximately on line 2—2 of Fig. 1.
Fig. 3 is a rear elevation on a reduced scale, of the camera shown in Fig. 1, part of the back being broken away to show some interior parts.

The shutter embodying the present invention is illustrated as applied to a camera of the "miniature" type, which is shown in plan view in Fig. 1, and which has a body 20 adapted to hold roll film, a focusing lens assembly 21, a supply spool 22 and a windup spool 23 for the film F which has edge perforations P (Fig. 3).

Built up from the top 24 of the camera body 20 is a chamber or housing 25 that contains parts of the shutter mechanism and timing controls, and which, on its top 26, has a disc 27 by which the operator may select certain speeds, and a second disc 28 for selecting other and slower speeds. An exposure recorder or counter, indicated generally by the numeral 29, is located in the center of the housing 25. Suitable range and view finders 30, with adjusting and compensating controls, indicated 31, also may be arranged in the housing 25, but these units form no part of the present invention.

Curtain structure

When the shutter is wound, both curtains that constitute the shutter proper are rolled around their respective rollers, hereinafter designated as "windup" rollers, which receive the curtains in the wound and set position.

Figure 17:
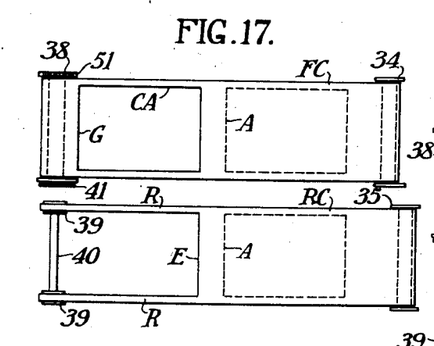
Fig. 17 is a diagrammatic elevation of the shutter curtains when the shutter is wound.
Figure 18:
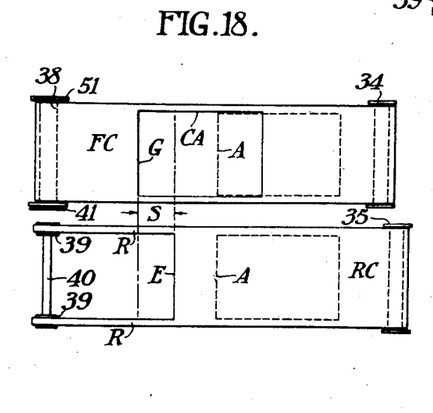
Fig. 18 is a similar view showing the shutter "slit" or established aperture passing over the exposure aperture of a camera.
Figure 19:
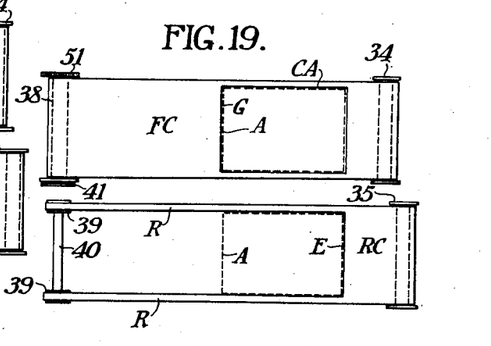
Fig. 19 is also a diagrammatic elevation similar to Figs. 17 and 18, the shutter curtains occupying the relation they will assume as the curtain apertures are in register with the exposure aperture.
Figure 20:
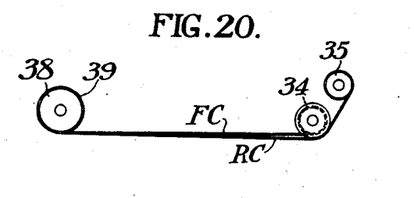
Fig. 20 is a diagrammatic top plan view showing the relation of the shutter members and the relation of the roller supports.

These curtains are shown, somewhat diagrammatically, in Figs. 17, 18, and 19, and are designated FC to represent the front curtain, or the one nearest the camera lens, and RC, the curtain nearest to the camera back. The curtain FC has an aperture CA, equivalent to the exposure frame A of the camera, while the curtain RC has an edge E adapted to cooperate with aperture CA to produce a variable width movable slit as will be presently described. Curtain FC has a foot roller 34 which is constantly urged counterclockwise to wind the curtain thereon (viewed from the top of the camera) by an internal spring, not shown, in the manner commonly employed in certin shutters, whereby the curtain is carried across the exposure frame of the camera when released. Curtain RC is similarly pulled and rolled around another foot roller 35.

At the left side of the exposure aperture A of the camera is a shaft 40 to which narrow spools 39 are pinned (Figs. 2 and 18.) These spools are adapted to receive ribbons R, attached to curtain RC at its edge E. The lower spool 39 carried a clutch disc 41 adapted to frictionally engage a toothed clutch member 42 that projects into a recess in the "windup" roller 38. The latter is adapted to receive the curtain FC when the winding or setting mechanism is operated. A ball bearing 43 at the top of the lower recess in roller 38 carries the weight of this roller so that it may rotate with minimum friction. The upper end of roller 38 also is recessed for balls 45, which constitute an anti-friction bearing between upper spool 39 and the roller 38.

A holding ratchet 47, having two teeth or shoulders 49 and 50 (see Figs. 4, 5, and 11) is fixed to the top of shaft 40. A latch, later to be described, cooperates with this ratchet to hold or release the rear curtain RC by reason of the connection of the latter to the shaft 40 through the spools 39.

Film wind and shutter setting

The roller 38, (Fig. 2) connected to the shaft 40 only through the friction clutch members 41 and 42, is controlled through suitable driving and holding means between a gear 51 which is part of roller 38, and a manual winding crank or lever 33 on the back of the camera (Fig. 3). This crank is mounted on a shaft 44 that extends through the camera back and carries the ratchet 36, constantly engaged by a pawl 37, the latter being mounted on the back of a crown gear 32. This crown gear, being free on the shaft 44, will be turned counterclockwise whenever the crank 33 is swung to the position shown in broken lines in Fig. 3. One or more of such movements accomplishes a complete winding of the shutter curtains, and so fully "sets" the shutter. This structure is more completely described in my copending application Serial No. 137,483 filed April 17, 1937.

The crown gear 32 meshes with a spur gear 52 (Figs. 2 and 3) that is pinned to a shaft 53. Sprockets 54, spaced to engage perforations P in the film F, are also attached to shaft 53. These elements are so proportioned that movement of the crank 33 above mentioned will cause the shaft 53 to make one complete revolution, and the film F will be advanced one frame. The film windup spool 23 is driven from gear 52 through a gear train 55 and an overrunning clutch, not shown, to maintain the required film tension.

Figure 6:
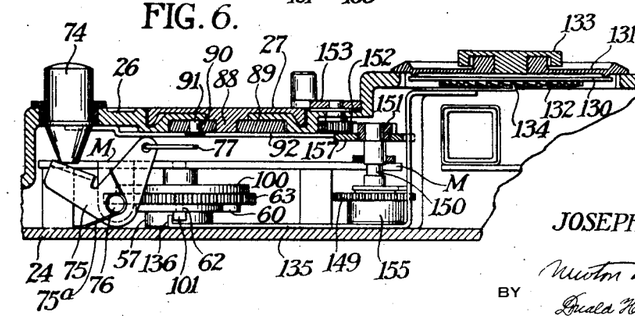
Fig. 6 is a fragmentary enlarged section and part elevation approximately on line 6—6 of Fig. 4.
Figure 12:
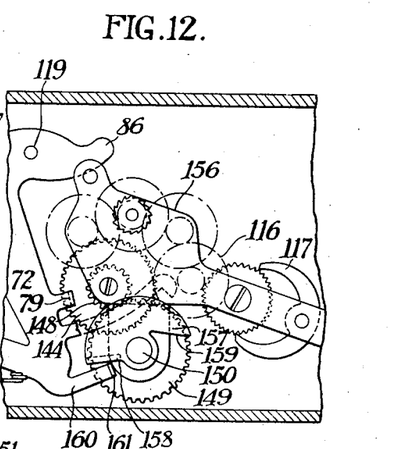
Fig. 12 is a view similar to Fig. 11 showing the delayed exposure action mechanism.
Figure 16:
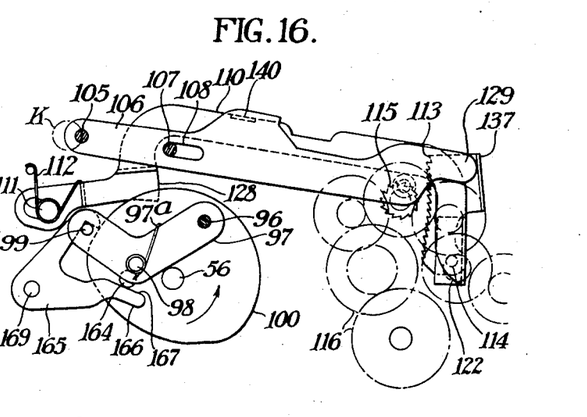
Fig. 16 is a plan view of the same parts shown in Fig. 15, with additional exposure regulating members, the shutter being "unwound" or released.

Certain parts of the mechanism, as will be clear by reference to Figs. 6, 12, and 16 are connected to or pivoted on a plate M, set on posts above the top wall 24 of the camera. For clearness, this plate has been omitted in all of the plan views of the drawings.

Shutter mechanism

The shaft 53 (Figs. 2, 4) has an extension 56 to which is fixed a holding ratchet 57, having a shoulder 58. A pawl 60, pivoted at 62, is normally held in engagement with shoulder 58 by a spring 61. The pivot 62 is a stud set into and extending downwardly from a gear 63, this gear being freely revoluble on shaft 56, so that if this shaft and the ratchet 57 are rotated clockwise (Fig. 4) as they will be whenever the winding lever 33 is moved as in Fig. 3, the pawl 60 and the gear 63 are rotated clockwise also, and gear 63, through idler gears 64 and 65 on a stud 66, drives gear 51 and therefore the curtain roller 38 in a clockwise direction to wind up both the front curtain FC directly, and the rear curtain RC through the friction disc clutch 41, into the relative positions diagrammatically illustrated in Fig. 17. To this end, a lever 66, hereinafter referred to as a latch lever (Fig. 11), is pivoted at 67 and has a shoulder or projection 68 adapted to intercept the shoulder 50 on ratchet 47 and thus to hold the shaft 46 and spools 39, when wound, against counterclockwise rotation and preventing the rear curtain RC from passing over the exposure aperture A.

Figure 4:
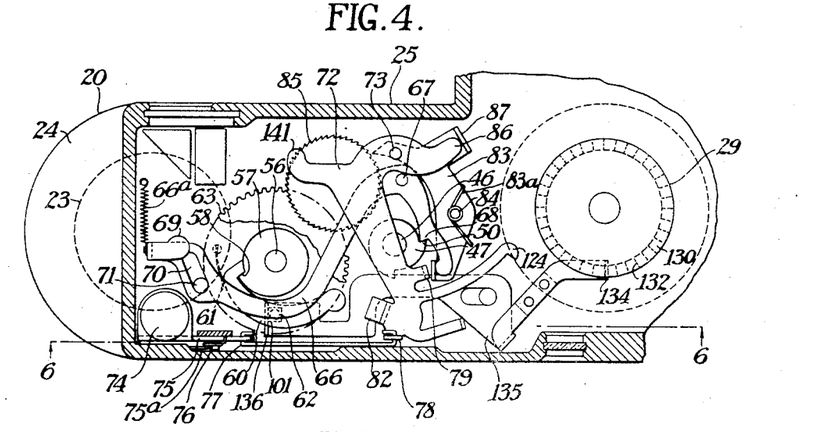
Fig. 4 is a fragmentary enlarged part section and part plan view showing some of the operating parts in wound position, ready to be released.
Figure 5:
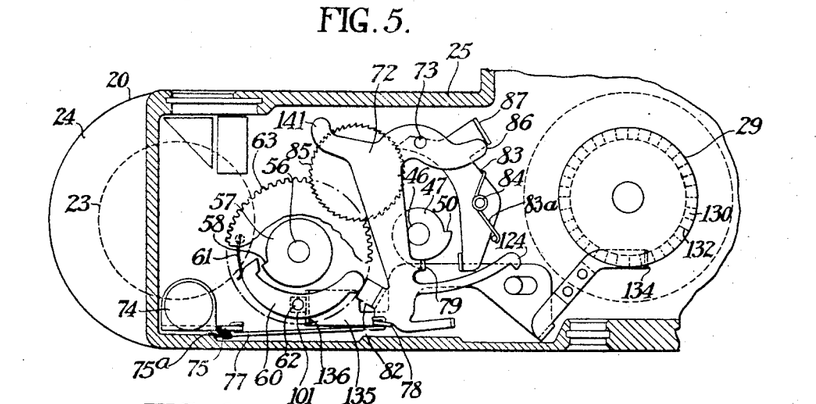
Fig. 5 is a similar view showing the relation of the parts after the operating button has been depressed.
Figure 11:
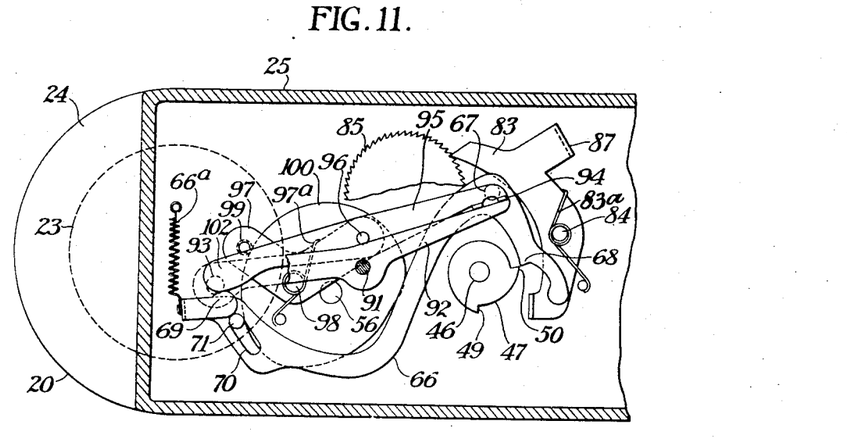
Fig. 11 is an enlarged part plan and part sectional view of a group of parts just after the release button has been depressed for an exposure shorter than 1/25 second.

The end of the latch lever 66 shown at the left in Figs. 2, 4, and 11 is turned up and toward the right and has a rounded portion 69. The lower portion of lever 66 has a slot 70, and a stationary pin 71 serves as a guide and a stop for limiting the swing of said lever.

Above lever 66 is a part 72, hereinafter designated as the release lever, and this part is pivoted at 73. The function of lever 72 is primarily to disengage the latch lever 66 from the shoulder 50, but several other functions and movements of parts are accomplished as the release lever swings to left and right about the pivot 73.

Operating button for setting slit

The operating button or trigger, 74 which is conveniently located so that it may be pressed by the operator's left index finger, is slidably mounted (Fig. 1, 3, and 6) at the upper left corner of the camera. A downward pressure on this trigger swings a bellcrank 75 about a pivot 76, against the action of a spring 75a, and through a link 77 that connects said bellcrank with an upturned lug 78 on the release lever 72, pulls the latter toward the left and into the position indicated in Fig. 5. At this point a lug 79 on lever 72 rests against shoulder 49 on holding ratchet 47, so that the latter cannot move counterclockwise even though latch 66 is disengaged from shoulder 50, as it is immediately, through means to be described. Ratchet 47, which is substantially integral with spools 39, cannot turn, and therefore curtain RC cannot move across exposure aperture A, until the operator lifts his finger from button 74. The spring 75a tends at all times to raise the button 74, by acting on bellcrank 75 (Fig. 6) and therefore tends to move release lever 72 to the right.

Ratchet 57, fixed to shaft 56, although turned clockwise by the movement of winding crank 33 as previously described, cannot move counterclockwise at any time, because of a pawl 80 pivoted on the underside of the camera top 24, that constantly engages a ratchet 81 also fixed to shaft 56 (Fig. 2). When lever 72 is moved to the position of Fig. 5, a lug 82 on said lever strikes the right end of pawl 60, and the gears 63, 64, 51, and 65, tend to rotate under the pull of the foot roller 34 to permit the curtain FC to pass over the aperture A to the roller 34. However, a pawl 83, pivoted at 84, moves to the left under the pressure of a spring 83a and engages a ratchet 85 that is fixed to gear 64. The latter, and therefore curtain FC, cannot move, even though pawl 60 is free from shoulder 58 of ratchet 57.

Trigger—shutter release

As the operator raises his finger from trigger 74, the spring 75a, through bellcrank 75 and link 77, moves release lever 72 toward the right, or counterclockwise about its pivot 73, until a prong 86 on said lever strikes a lug 87 on pawl 83 and disengages the latter from ratchet 85. The curtain FC is then free to be rolled onto the foot roller 34, and when it has moved a predetermined distance, to establish the exposure slit, the curtain RC is also released and said slit passes over the exposure aperture A. The means for determining the width of the slot, which may be controlled manually or by a photronic selector, will now be described, the manual means only being set forth at this time.

Speed selector

Figure 7:
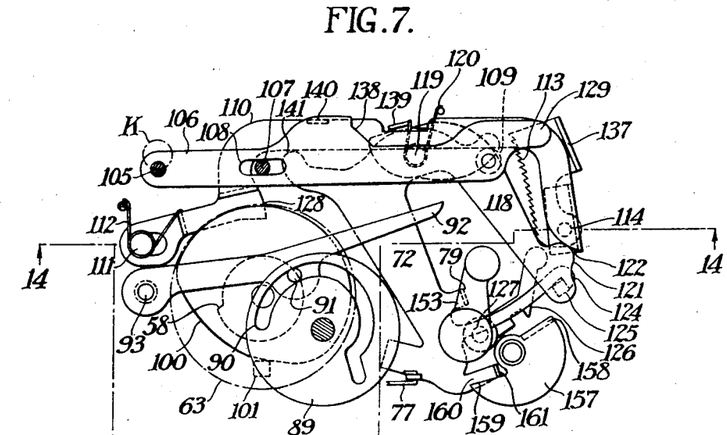
Fig. 7 is a plan view of a group of operating parts, set for a shutter speed of 1/25 second.
Figure 14:
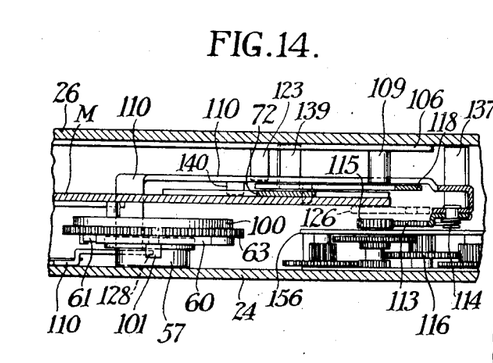
Fig. 14 is a fragmentary section on the line 14—14 of Fig. 7.

Referring first to Figs. 1, 2, and 7, the primary speed selector starts with a revoluble indexed disc 27. This disc has a stud 88 extending through the top 26 of housing 25, (Fig. 2) to which is fixed a disc 89 having a cam slot 90 best shown in Fig. 7. A pin 91, cooperating with this slot, is fixed in an arm 92, hereinafter mentioned as the selector member, pivoted at 93. The free end of selector member 92 may engage (Fig. 11) an upturned forked end 94 on a lever 95, hereinafter designated as an interceptor, that is pivoted at 96 on a bellcrank 97. The latter may be rotated about its own pivot 98 against the action of a spring 97a. This spring constantly tends to rotate the bellcrank 97 clockwise (Figs. 15 and 16) about the pivot 98 and thus to press a pin 99 that projects downward from one end of said bellcrank, into contact with the periphery of a cam 100, which is attached to the gear 63. A square pin 101, Figs. 11 and 14, (an extension of pawl pivot 62) extends downwardly below the gear 63 and into the plane of the latch 66. The left end 102 of the interceptor member 95 lies in the plane of lug 69 on latch member 66.

When the operator presses the button 74, the release lever 72 disengages the pawl 60 from the ratchet 57, while the shoulder of latch 66 is holding ratchet 47 and curtain RC from unwinding or passing across the exposure aperture A. This movement permits pawl 83 to engage ratchet 85 and hold curtain FC from unwinding. When the trigger 74 is released, lever 72 moves toward the right and its end 86 disengages pawl 83 from ratchet 85. The pull of foot roller 34, transmitted through curtain FC and gears 51, 65, 64, and 63 rotates cam 100 counterclockwise, and the curtain FC moves to approximately the relative position shown in Fig. 18.

During this movement, bellcrank 97 has been turned by its spring 97a and pin 99 has been brought into contact with the periphery of cam 100. As the latter rotates, the pin 99 follows it, so that the opposite end of the bellcrank 97, on which interceptor lever 95 is mounted, moves toward the back of the camera. Member 95 is thus carried bodily in the same direction, but as the forked end 95 thereof strikes the pointer, the movement of the end 94 is arrested and the opposite end 102 then swings toward the back of the camera and strikes the upturned end 69 of latch 66. The contact of pin 99 with cam 100 has then stopped the curtain FC for an instant, but as soon as end 102 of member 95 strikes lug 69 as aforesaid, the latch 66 is swung about its pivot 67 in a counterclockwise direction and the shoulder 68 slips off from shoulder 50 on holding ratchet 47, thus releasing shaft 46. The curtains RC and FC then move together across the aperture A of the camera.

The combined effects of the position of pointer 178 and the contour of cam 100 determine the point at which the end 102 of interceptor 95 strikes the end 69 of latch 66, and hence establishes the "slit" or distance between edge E of curtain RC and edge G of curtain FC.

Automatic exposures

On exposures of 1/25 second it is necessary that the full opening CA shall pass unobstructed across the camera aperture A. The parts have been so designed that this will be accomplished by the simultaneous release of both curtains from the fully wound position, or from the relative positions of Figs. 4 and 17. The proportions of the parts above described are such that when the selector 92 has been moved to the ⅟₂₅ location, it will be close against the forked end 94 of the member 95, so that the end 94 will not move at all when the bellcrank 97 begins to turn about the pivot 98. The result of this is that pawl 83 is disengaged from the ratchet 85 at the same instant that latch 66 is pushed away from ratchet 47. Both curtains then move together and the full aperture CA passes across camera aperture A and makes the required exposure.

For speeds slower than ⅟₂₅, such as ⅟₁₀, ⅕, ½, and 1 second, a retarding mechanism is introduced, which is controlled by movement of the dial indicator 28. For the above speeds, the dial 27 is set at ⅟₂₅, and the dial 28 may then be set at the selected slower speed.

Figures 8, 10:
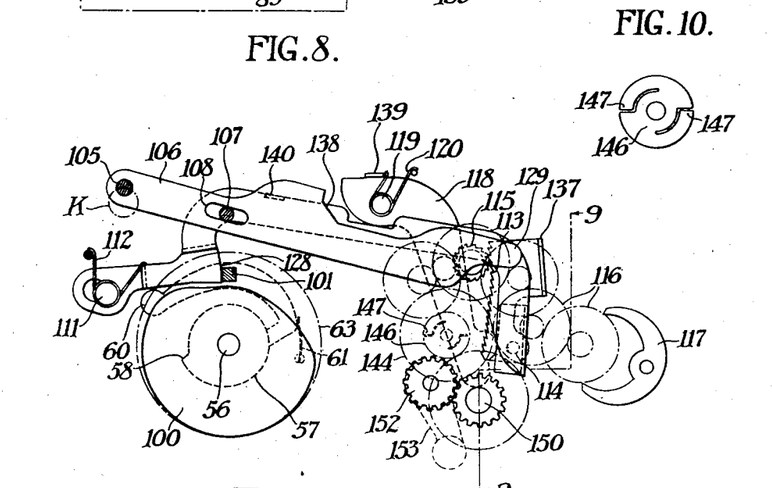
Fig. 8 is a view similar to Fig. 7 showing the parts set for operation at 1 second.
Fig. 10 is a detail of a clutch member.

A pin 105 (Fig. 16), eccentrically mounted in dial 28, projects through the housing top 26 and engages a lever 106, pivoted at 107 and having a slot 108 to permit longitudinal movement. Obviously, as pin 105 describes a circle, indicated at K in Figs. 7, 8, and 16, in being moved to various positions, the right end of 106 will be moved forward or backward or from right to left, and will therefore cause a pin 109 in said right end to assume various positions. The pin 109 constitutes a stop for a hooked member 110 that is pivoted at 111 and is constantly urged downwardly and toward the right by a spring 112. Member 110, hereinafter referred to as the driver, carries at its free end a rack 113 that is pivoted at 114. This rack is adapted to engage a ratchet 115, mounted on an intermediate member of a gear train 116. This train is governed or retarded by a pallet 117, the whole train being mounted in a frame 156 attached to the top wall 24 of the camera.

An arm 118, pivoted at 119, is urged counterclockwise by a spring 120 so that its free end at 121 normally contacts a curved portion 122 on the free end of driver 110. Inasmuch as spring 112 constantly forces driver 110 toward the right, the latter is normally spaced away from ratchet 115. Spring 120 is stronger than spring 112.

When the release lever 72 is swung to the left as button 74 is pressed, a hook 124 on said lever engages a square pin 125 on the end of arm 118 and thereby swings this arm to the left so that pin 125 is caught and held by a spring latch 126, pivoted at 127. Thus the end 122 of driver 110 is no longer obstructed and may be moved to the left against the action of spring 112.

When the button 74 is released, with the parts set as above described, the curtain FC moves a sufficient distance to bring aperture CA into register with camera exposure aperture A. This is accomplished in exactly a half revolution of cam 100. The square pin 101 on gear 63 then contacts an abutment 128 on driver 110 and forces the entire driver toward the left (the pivot end being slotted as shown in Fig. 7) thus bringing rack 113 into engagement with ratchet 115. This movement of the driver 110 toward the left also causes its free end 122 to contact the free end of latch 126 and to disengage the latter from pin 125. Arm 118 is then swung counterclockwise by its spring 119 into contact with end 122 but cannot move driver 110 toward the right because of the continuing effort of pin 101 to force it to the left.

The pressure of arm 118 does, however, result in moving driver 110 forwardly, so that rack 113 traverses ratchet 115 and revolves the gear train as fast as permitted by pallet 117. The movement of the gear train permits rack 113 to be carried forwardly until driver 110 has moved to a point where the abutment 128 will slip off from pin 101, at which point the cam 100 under the pull of the curtain spring in foot roller 34 completes its revolution, and curtain FC closes camera aperture A, placing the shutter in condition for rewinding. Spring 112 then forces driver 110 toward the right, where rack 113 is again free from ratchet 115. The pin 101, and therefore the pawl 60, have thus been returned to the starting point (one complete revolution) and the pawl 60 is again in engagement with shoulder 58 on ratchet 57.

*Time exposures*

In operating the shutter for "time" exposures, the button 74 must be pressed and released, then pressed and released again. When the dial 28 is set for "T" the pin 105 has been moved to its farthest travel toward the right, as shown in fragmentary view, Fig. 16. In this position, the downturned end 129 of regulating lever 106 abuts an upstanding lug 137 on rack 113 and prevents the latter from engaging the ratchet 115 at any point in the operation of the shutter.

When the shutter is wound and ready for release, with the parts set for "time" exposures as above described, the first pressure of button 74 moves release lever 72 and frees pawl 60 from shoulder 58 of ratchet 57 as in higher speed operations, and curtain FC passes over aperture A. Pin 101 strikes abutment 128 and thus aperture CA stops over exposure aperture A, as in Fig. 19. In moving the regulator 106 to farthest right position, a portion 138 thereon contacts a lug 139 on the lever 118 and swings the latter clockwise against the action of spring 120, so that pin 125 rests in latch 126. The end 121 of 118 then cannot interfere with movement of driver 110 toward the left.

A downturned lug 140 on driver 110 is so located that when the latter is in its normal position an end projection 141 on release lever 72 will pass said lug when the release lever is moved to the left as button 74 is pressed. After button 74 is released, the pin 101 has pushed driver 110 to the left (as in Fig. 8) the lug 140 will lie in the path of travel of end 141. On the second pressure of button 74 this part 141 strikes lug 140, thus pushing the driver 110 forwardly against the action of spring 112, carrying the abutment 128 past the pin 101. The cam 100 is then free to complete the second half of its revolution as soon as button 74 is released. It is to be understood that curtain FC can never complete its movement and close aperture A until release lever 72 has swung to the right as the operator removes his finger from button 74. This movement then permits end 86 of the release lever to disengage pawl 83 from ratchet 85 leaving curtain FC free to be wound on foot roller 34. This latter holds true for all conditions of operation.

*Delayed action*

The shutter as illustrated herewith is also provided with a "delayed action" mechanism, whereby the operator may set the shutter and release the operating button, but the shutter will not be released until several seconds have elapsed, thus permitting the operator to take his own picture.

Figure 9:
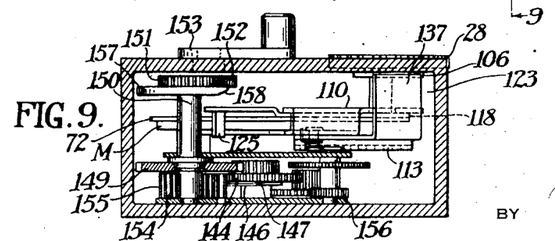
Fig. 9 is an enlarged fragmentary section on line 9—9 of Fig. 8.
Figure 13:
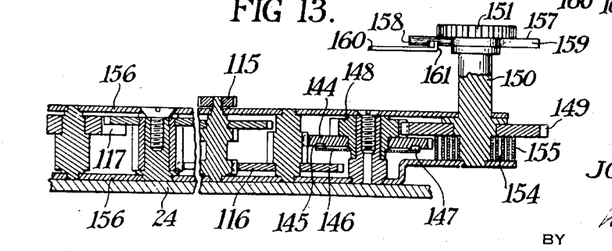
Fig. 13 is a vertical section of the retarding gear train assembly.

The gear train 116 as shown in the sectional view, Fig. 13, has at one point a gear 144 that is freely revoluble on a shouldered portion of a pinion 148. The latter is driven by a gear 149 that is mounted on a shaft 150. At the top of shaft 150 is a pinion 151 secured thereto, and meshing with a similar pinion 152. A crank 153 (Fig. 9) on the top of the housing 26 is fixed to pinion 152, and when swung from the position indicated in Fig. 1 to that indicated in Fig. 7, acts through the shaft 150 to wind a spiral spring 154, one end of which is attached to the shaft 150, the other end being attached to a stationary casing 155 which is fixed on the frame 156 that serves as a mounting for the entire gear train.

When the spring 154 is wound as aforesaid, the pinion 148 is rotated counterclockwise (viewed from above). A spring washer 146, (Fig. 10) is staked to the shank of pinion 148 and therefore revolves with it, so that two toothlike portions 147 of the washer 146, which in effect constitute a double pawl, will pass over ratchet teeth 145 on the underside of gear 144. If now, the spring 154 is released, which may be accomplished as later described, the driving energy of the spring will be transmitted through gear 149, pinion 148 and washer 146, the teeth 147 of which will then engage the ratchet teeth 145 and will drive the gear 144 in a counterclockwise direction, and this gear will drive the rest of the train 116, through to the governing pallet 117. The extent to which the spring 154 is wound, or the arc through which the operator moves the crank arm 153 in setting the "delayed action" determines the length of time the gear train will run and the relative speed of shaft 150. A full winding may run as much as 15 or 20 seconds depending on the design of the various members of the train.

*Slow automatic exposures*

It is to be understood that the driver 110, when acting against the ratchet 115 as previously described in connection with exposures of $\tfrac{1}{10}$, $\tfrac{1}{5}$ etc. only moves the portion of the gear train 116 that is between washer 146 and pallet 117. The gear 144 under this condition rotates counterclockwise, so that the teeth 145 on its under side pass freely over the spring ends 147 of the washer 146.

The manner in which the retarded movement of shaft 150 is employed to cooperate with the shutter release mechanism, whereby the latter is permitted to move and release the shutter at the end of the gear train operation, is as follows: Fixed on the shaft 150, under pinion 151, is a cam 157, (Fig. 11) of generally semicircular form, and having one substantially radial edge 158 that is beveled on its underside, and another edge 159, not beveled, that is, in the present structure, approximately 200 degrees of arc from edge 158. At the unwound position of the delayed-action mechanism, the beveled edge 158 lies adjacent to an arm 160 that extends to the right and is part of release lever 72. As the operator moves the crank 153 clockwise, thus winding spring 154, the cam 157 rotates counterclockwise and the beveled edge 158 passes over the upturned end 161 of arm 160. The latter, being springy, will be depressed as the cam 157 rotates, but as soon as the cam has reached the fully wound position (Fig. 7) arm 160 springs up and its upturned end 161 blocks the cam 157 against rotation clockwise by contacting edge 159, and thus holds the spring 154 in wound condition. When the operator presses the button 74, the release lever 72 is moved to the left, as previously described, and the arm 160 is withdrawn from the edge 159 of the cam. The spring 154 immediately starts the gear train, the cam 157 begins to revolve clockwise, and as the operator releases the button 74 the lever 72 moves to the right and the upturned end 161 of arm 160 strikes and rides along on the semi-circular periphery of the cam, thus preventing the complete return of release lever 72. As the gear train revolves, this relation is maintained until the cam 157 has again reached the position of Fig. 12. The end 161 of arm 160 then slips past the edge 158, the lever 72 completes its return movement, and in so doing, frees pawl 83 from ratchet 85 as previously described to make an exposure.

Figure 15:
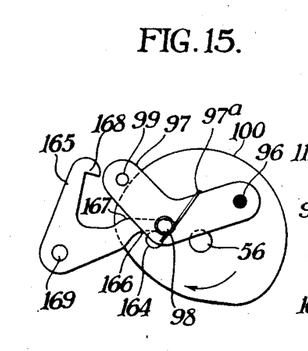
Fig. 15 is a fragmentary plan view of a latch member and associated parts, the shutter being "wound".

The bellcrank 97, constantly urged in a clockwise direction about its pivot 98, tends to carry the pin 99 into contact with the periphery of cam 100 at all times. During the unwinding of the shutter this is necessary, in order to release the curtain FC as required to establish the correct "slit" between edge G of FC and edge E of RC, as previously described. On the clockwise or winding operation however, the pin 99 should be clear of the cam, and therefore a latch is provided, in the form of a bellcrank 165, pivoted at 169 (Fig. 15). A pin 164, projecting upwardly from cam 100 (Figs. 2, 15, and 16) strikes the edge 166 of one arm of the latch 165 (Fig. 15) when the shutter is wound, and throws the other arm of the latch, which carries a hook 168, away from the cam. As the cam 100 makes one revolution counterclockwise on the release movement, the pin 164 strikes the edge 167 and swings the member 165 to the position of Fig. 16, so that hook 168 lies in front of pin 99 and prevents spring 97a from pressing said pin toward the cam. Pin 99 is thus held out from the cam until the shutter is again rewound, or until the cam is turned a full revolution clockwise, to the position of Fig. 15.

*Exposure counter*

As the film F is advanced one frame each time the winding crank 33 is fully operated, by means of the sprockets 54, a recorder or exposure counter 29 is embodied in the camera which is operated automatically. This counter (Figs. 1 and 9) includes a calibrated dial 130, mounted in a suitable coverplate 131 and having ratchet teeth 132 on its under side corresponding to the calibrations. A knob 133 projecting above the coverplate 131 permits resetting of the dial manually.

Step by step rotation of the dial 130 is accomplished by a hook 134 on a slidable bar 135 that is suitably guided on the top 24 of the camera. A lug 136 projects upwardly from this bar and is so located that it will be struck by the square pin 101. This pin strikes the right side of lug 136 when the shutter is wound—i. e., when the ratchet 57, carrying pawl 60 with it, has been rotated 360° clockwise. This carries the slide bar 135 toward the left, so that hook 134, in engagement with one of the teeth 132, rotates dial 130 the space of one tooth, or one index numeral. When the shutter is released, and gear 63 and pawl 60 have rotated 360° counterclockwise, the pin 101 strikes the left side of lug 136 and moves slide bar 135 to the right a sufficient distance to engage the next ratchet tooth of dial 130. The slide bar 135 rests in this position until the shutter is again wound.

*Summary of operation*

While the operation of the various parts has been described, the operation of the shutter may be summarized as follows: If an operator desires a rapid exposure of say 1/1000 of a second, dial 27 is set to this speed. The handle 33 is moved to position a fresh area of film and wind up the shutter curtains. By depressing the trigger or push button 74 one curtain moves a distance necessary to make the desired slot for the selected exposure and then stop. By releasing the trigger 74 permitting it to move upwardly both curtains are released so that they may move together across the exposure aperture A, the slot between them remaining constant and causing an exposure to be made.

If a delayed exposure is desired the handle 153 may be moved to set spring 155 and the mechanism in running down causes an exposure to be made.

For short automatic exposures dial 27 is set; for longer automatic slow exposures of over 1/25 of a second, dial 27 is set to 1/25 and dial 28 is set to the desired time, as 1/2 second. The exposure is made as before by depressing button 74 to set the slit in the shutter and releasing the button to make the exposure.

With the button 74 described above which is released, instead of depressed as in known shutters, it is quite obvious that all tendency to shake the camera is eliminated since the operator is not overcoming tension on a spring at the instant an exposure is made. The movement of the button through its two paths for setting and releasing the shutter can be accomplished quickly and easily, and the tendency to move the camera is eliminated.

I claim:

1. In a focal plane shutter for cameras the combination with a pair of curtains, of separate spring rollers for the curtains, one for each curtain, a pair of pawls, one for holding each curtain against movement, a pair of separately rotatable members on which parts of each curtain are attached, and mechanisms for controlling the release of the pawls comprising a settable dial carried by the shutter, markings on the dial and shutter for indicating exposure, a pivoted lever adjustable by said dial forming a speed selector stop, a second pivoted lever, a cam operated by the first curtain for moving said lever, and a latch trip pivotally attached to the second pivoted lever and having an upturned end to engage the selector, whereby movement of the cam controlled lever may swing said tripping lever until one end strikes the selector whereby the opposite end may be moved about the pivot to trip the pawl releasing the second curtain and an exposure may be made.

2. In a focal plane shutter for cameras, the combination with two curtains, independent spring rollers, one for each curtain, supports for the opposite ends of said curtains including a drum, and coaxially arranged spools, one end of one curtain including tapes attached to the drums, and an end of the other curtain being fastened to the drum, means for controlling the relative movement of the two curtains comprising a trigger, a holding pawl for one curtain operated upon by the trigger, a second holding pawl for the other curtain, connections between the trigger operated pawl and the second pawl comprising a speed adjusting dial carried by the camera, a timing cam carried thereby, a stop adapted to be set by the cam, a pivoted lever carrying a swingable pivot, a floating lever carried by the pivot, said floating lever including two ends one adapted to strike the time controlling stop and the other to strike and release the second latch whereby one curtain may be released at a predetermined interval after the first curtain is released, and a cam operable by the first released lever for moving the swingable lever carrying the swingable pivot.

3. In a focal plane shutter for cameras, the combination with two curtains, independent spring rollers, one for each curtain, supports for the opposite ends of said curtains including a drum, and coaxially arranged spools, one end of one curtain including tapes attached to the drums, and an end of the other curtain being fastened to the drum, means for controlling the relative movement of the two curtains comprising a trigger, a holding pawl for one curtain operated upon by the trigger, a second holding pawl for the other curtain, connections between the trigger operated pawl and the second pawl comprising a speed adjusting dial carried by the camera, a turning cam carried thereby, a stop adapted to be set by the cam, a pivoted lever carrying a swingable pivot, a floating lever carried by the pivot, said floating lever including two ends one adapted to strike the time controlling stop and the other to strike and release the second latch whereby one curtain may be released at a predetermined interval after the first curtain is released, a cam connected to the curtain which is released first to be operated one revolution thereby, said swingable lever contacting with said cam and adapted to be moved to and from a position in which the floating lever may be operative to release the second curtain.

4. In a focal plane shutter for cameras, the combination with two curtains, independent spring rollers one for each curtain, supports for the opposite ends of said curtains including a drum, and coaxially arranged spools, one end of one curtain including tapes attached to the drums, and an end of the other curtain being fastened to the drum, means for controlling the relative movement of the two curtains comprising a trigger, a holding pawl for one curtain operated upon by the trigger, a second holding pawl for the other curtain, connections between the trigger operated pawl and the second pawl comprising a speed adjusting dial carried by the camera, a timing cam carried thereby, a stop adapted to be set by the cam, a pivoted lever carrying a swingable pivot, a floating lever carried by the pivot, said floating lever including two ends one adapted to strike the time controlling stop and the other to strike and release the second latch whereby one curtain may be released at a predetermined interval after the first curtain is released, a cam connected to the curtain which is released first to be operated one revolution thereby, the shape of said cam being such that said swingable lever is normally held in an inoperative position out of contact with the settable stop and second curtain pawl whereby said adjustable dial may be set at any time before or after an exposure has been made.

5. In a focal plane shutter for cameras, the combination with two curtains, independent spring rollers one for each curtain, supports for the opposite ends of said curtains including a drum, and coaxially arranged spools, one end of one curtain including tapes attached to the drums, and an end of the other curtain being fastened to the drum, means for controlling the relative movement of the two curtains comprising a trigger, a holding pawl for one curtain operated upon by the trigger, a second holding pawl for the other curtain, connections between the trigger operated pawl and the second pawl comprising a speed adjusting dial carried by the camera, a timing cam carried thereby, a stop adapted to be set by the cam, a pivoted lever carrying a swingable pivot, a floating lever carried by the pivot, said floating lever including two ends one adapted to strike the time controlling stop and the other to strike and release the second latch whereby one curtain may be released at a predetermined interval after the first curtain is released, a cam connected to the curtain which is released first to be operated one revolution thereby, the shape of said cam being such that said swingable lever is normally held in an inoperative position out of contact with the settable stop and second curtain pawl whereby said adjustable dial may be set at any time before or after an exposure has been made, and an edge included in said cam for rapidly moving the floating arm towards an operative pawl tripping position as said cam is turned by movement of the first released curtain.

6. In a focal plane shutter for cameras, the combination with a pair of flexible curtains, of separate spring actuated rollers for winding each curtain, a pair of spaced spools, a shaft to which the spools are keyed, tapes connected to the spools and one curtain, a roller mounted freely on the shaft between the spools supporting the other curtain, separate holding ratchets for the spools and roller, separate pawls for engaging the holding ratchets, a trigger for releasing one holding ratchet, and means for releasing the other holding ratchet comprising a manual speed stop, suitable graduations to determine the position of said stop, a rotatable cam operable by the curtain released by the trigger and means operated by the cam for tripping the second holding pawl including a floating lever including two oppositely disposed arms, a pivot carrying the lever between its ends, said means operated by the cam swinging said lever bodily until one end of the floating lever hits said stop and the other end trips the second holding pawl thereby releasing the second curtain a predetermined time after the first curtain is released by the trigger.

7. In a focal plane shutter for cameras, the combination with a pair of flexible curtains, of separate spring actuated rollers for winding each curtain, a pair of spaced spools, a shaft to which the spools are keyed, tapes connected to the spools and one curtain, a roller mounted freely on the shaft between the spools supporting the other curtain, separate holding ratchets for the spools and roller, separate pawls for engaging the holding ratchets, a trigger for releasing one holding ratchet, and means for releasing the other holding ratchet comprising a manual speed stop, suitable graduations to determine the position of said stop, a rotatable cam operable by the curtain released by the trigger and means operated by the cam for tripping the second holding pawl including a floating lever including two oppositely disposed arms, a pivot carrying the lever between its ends, said means operated by the cam swinging said lever bodily until one end of the floating lever hits said stop and the other end trips the second holding pawl thereby releasing the second curtain a predetermined time after the first curtain is released by the trigger, a friction clutch between the coaxially arranged spools and roller and means for tensioning the two curtains after an exposure has been made.

8. In a focal plane shutter for cameras, the combination with a pair of flexible curtains, of separate spring actuated rollers for winding each curtain, a pair of spaced spools, a shaft to which the spools are keyed, tapes connected to the spools and one curtain, a roller mounted freely on the shaft between the spools supporting the other curtain, separate holding ratchets for the spools and roller, separate pawls for engaging the holding ratchets, a trigger for releasing one holding ratchet, and means for releasing the other holding ratchet comprising a manual speed stop, suitable graduations to determine the position of said stop, a rotatable cam operable by the curtain released by the trigger and means operated by the cam for tripping the second holding pawl including a floating lever including two oppositely disposed arms, a pivot carrying the lever between its ends, said means operated by the cam swinging said lever bodily until one end of the floating lever hits said stop and the other end trips the second holding pawl thereby releasing the second curtain a predetermined time after the first curtain is released by the trigger, a friction clutch between the coaxially arranged spools and roller and means for tensioning the two curtains after an exposure has been made, including gearing connected to the roller, a pawl and ratchet for moving one of said gears in one direction only, and a handle for turning the gearing through the pawl and ratchet whereby the roller and spools may move as the former transmits movement to the latter through the friction clutch.

9. In a focal plane shutter for cameras, the combination with a pair of curtains, a spring operated drum to which one end of each curtain is attached, a rotatable support for the opposite end of each curtain, separate pawls for holding the rotatable supports for each curtain against movement, a trigger for releasing the first curtain pawl and mechanism operated by movement of the first curtain for controlling the release of the pawl holding the second curtain, said mechanism including a speed adjusting dial carried by the shutter and movable to predetermine the speed of an exposure, a stop positioned by said dial and comprising a lever, pivotally mounted at one end, a flange at the other end forming a stop, and an operative connection between the lever and dial for moving the former by the latter, a floating lever pivoted intermediate its ends having one end adapted to be controlled by the dial, and means operated by the first curtain for swinging the pivot carrying the floating lever whereby one end thereof may strike said dial operated stop and the other end thereof may trip the second curtain pawl whereby the first curtain may precede the second curtain by a predetermined amount.

10. In a focal plane shutter for cameras, the combination with a pair of curtains, a spring operated drum to which one end of each curtain is attached, a rotatable support for the opposite end of each curtain, separate pawls for holding the rotatable supports for each curtain against movement, a trigger for releasing the first curtain pawl and mechanism operated by movement of the first curtain for controlling the release of the pawl holding the second curtain, said mechanism including a speed adjusting dial carried by the shutter and movable to predetermine the speed of an exposure, a stop positioned by said dial and spaced from the second curtain pawl, a floating lever pivoted intermediate its ends and having one end adapted to be controlled by the dial, means for bodily moving the floating lever toward the dial stop and curtain pawl until the ends of the lever by striking the stop swings upon its pivot to release said second curtain pawl, the means including a part moved by the rotatable support for the first curtain.

11. In a focal plane shutter for cameras, the combination with a pair of curtains, a spring operated drum to which one end of each curtain is attached, a rotatable support for the opposite end of each curtain, separate pawls for holding the rotatable supports for each curtain against movement, a trigger for releasing the first curtain pawl and mechanism operated by movement of the first curtain for controlling the release of the pawl holding the second curtain, said mechanism including a speed adjusting dial carried by the shutter and movable to predetermine the speed of an exposure, a stop positioned by said dial and spaced from the second curtain pawl, a floating lever pivoted intermediate its ends and having one end adapted to be controlled by the dial, means for bodily moving the floating lever toward the dial stop and curtain pawl until the ends of the lever by striking the stop swings upon its pivot to release said second curtain pawl, the means including a part moved by the rotatable support for the first curtain, whereby the floating lever may be moved only after the first curtain has moved, and a spring for normally holding said floating lever out of the path of the dial stop whereby said dial may be adjusted either before or after an exposure is made.

12. In a focal plane shutter for cameras, the combination with a pair of curtains, a spring operated drum to which one end of each curtain is attached, a rotatable support for the opposite end of each curtain, separate pawls for holding the rotatable supports for each curtain against movement, a trigger for releasing the first curtain pawl and mechanism operated by movement of the first curtain for controlling the release of the pawl holding the second curtain, said mechanism including a speed adjusting dial carried by the shutter and movable to predetermine the speed of an exposure, a stop positioned by said dial and spaced from the second curtain pawl, a floating lever pivoted intermediate its ends and having one end adapted to be controlled by the dial, means for bodily moving the floating lever toward the dial stop and curtain pawl until the ends of the lever by striking the stop swings upon its pivot to release said second curtain pawl, said means including a part movably connected to the first curtain rotatable support whereby movement of the first curtain swings the floating lever to trip the second curtain pawl after a time interval determined by the dial.

13. In a focal plane shutter for cameras, the combination with a shutter casing, of two curtains mounted therein, a separate spring roller for each curtain, a separate winding roller support for each curtain, separate releasing pawls for each curtain, a timing mechanism carried by the shutter casing and including an adjustable stop which may be moved independently of the curtains for controlling the relation between the curtains for an exposure, a trigger for actuating the first curtain pawl, a second curtain pawl tripping lever comprising a two armed floating lever, a pivot supporting the lever between its ends and means for swinging the pivot carrying the lever bodily from an inoperative position spaced from the second curtain pawl and the stop into a position to contact with these parts to trip the second curtain pawl, and connections between said means and said first curtain roller support.

14. In a focal plane shutter for cameras, the combination with a shutter casing of two curtains mounted therein, a separate spring roller for each curtain, a separate winding roller support for each curtain, separate releasing pawls for each curtain, a timing mechanism carried by the shutter casing and including an adjustable stop which may be moved independently of the curtains for controlling the relation between the curtains for an exposure, a trigger for actuating the first curtain pawl, a second curtain pawl tripping lever comprising a two armed floating lever, a pivot supporting the lever between its ends, and means for swinging the pivot carrying the lever bodily from an inoperative position spaced from the second curtain pawl and the stop into a position to contact with these parts to trip the second curtain pawl, and connections between said means and said first curtain roller support, said means being movable by the first curtain roller support to remove said floating lever to its inoperative position after the second curtain pawl has been tripped.

JOSEPH MIHALYI.